United States Patent
Ishizuka et al.

(10) Patent No.: US 7,069,805 B2
(45) Date of Patent: Jul. 4, 2006

(54) DRIVING FORCE TRANSMISSION DEVICE

(75) Inventors: Tetsuya Ishizuka, Kanagawa (JP); Hiromichi Nakayama, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 10/106,913

(22) Filed: Mar. 28, 2002

(65) Prior Publication Data

US 2002/0139211 A1   Oct. 3, 2002

(30) Foreign Application Priority Data

Mar. 30, 2001   (JP) ............................. 2001-099378

(51) Int. Cl.
*F16H 55/08* (2006.01)

(52) U.S. Cl. .................. 74/457; 74/DIG. 10; 74/461; 74/462

(58) Field of Classification Search ............... 74/431, 74/457, 460, 461, 462, 421 R, DIG. 10, 443; 29/893.3, 893
See application file for complete search history.

(56) References Cited

U.S. PATENT DOCUMENTS 5,595,090 A * 1/1997 Moribayashi ............... 74/462
6,070,484 A * 6/2000 Sakamaki ............. 74/DIG. 10
6,881,166 B1 * 4/2005 Burkhardt et al. .......... 474/176

FOREIGN PATENT DOCUMENTS

| JP | 022217656 A | * | 8/1990 |
| JP | 6254899 A | * | 9/1994 |
| JP | 10196766 A | * | 7/1998 |
| JP | 10196767 A | * | 7/1998 |
| JP | 10220560 A | * | 8/1998 |
| JP | 2000110919 A | * | 4/2000 |
| JP | 2000-310297 | | 11/2000 |
| JP | 2000346176 A | * | 12/2000 |

* cited by examiner

Primary Examiner—David M. Fenstermacher
(74) Attorney, Agent, or Firm—Sughrue Mion, PLLC

(57) ABSTRACT

A driving force transmission device includes a rim having a toothed outer periphery, with bottom lands being formed between respectively adjacent teeth and top lands being formed at teeth crests. Outer ribs are disposed at positions on an inner peripheral surface of the rim corresponding to the bottom lands, whereby there is neither variance in angle speed nor uneven rotation of a member driven by the transmission device. Moreover, the outer ribs are radially offset from inner ribs, whereby tensile forces generated between the outer and inner ribs and caused by material shrinkage cancel each other out and defective molding of teeth crests can be minimized. Accordingly, the radius of an imaginary circle formed by joining the top lands is uniform in a circumferential direction.

10 Claims, 6 Drawing Sheets

DRIVING FORCE TRANSMISSION DEVICE

BACKGROUND OF THE INVENTION

1. Field of the Invention

The present invention relates to a driving force transmission device made of synthetic resin.

2. Description of the Related Art

Because gears made of synthetic resin can be readily formed by injection molding or the like at a low cost, manufacturing costs of drives employing synthetic resin gears can be reduced.

However, synthetic resin gears have drawbacks which metal gears do not, such as sink marks (i.e., defective shallow depressions) resulting from material shrinkage after a thick gear is molded. It is therefore necessary for synthetic resin gears to have a minimum thickness in order to prevent such sink marks from forming, and at the same time have sufficient rigidity and strength.

In a conventional gear 100 shown in FIGS. 5 and 6, an annular rib 106 is disposed between a boss 102 formed at the center of the gear 100 and a rim 104. Ribs 108 are interposed between and connect the boss 102 and the annular rib 106, and ribs 110 are interposed between and connect the annular rib 106 and the rim 104. A disc-shaped member 112 is disposed at a width-direction center of the rim 104 and connects (extends between) the rim 104 and the boss 102. Teeth are disposed along an outer periphery of the rim 104, with bottom lands being formed between respectively adjacent teeth and top lands 114 being formed at crests of the teeth. A radius R is equal to the distance from the center of the boss 102 to an imaginary circle formed by joining the top lands 114 (hereinafter, "top land circle").

As mentioned above, when the gear 100 is made of synthetic resin, there arises a problem in that portions of top lands 114 corresponding to positions at which the ribs 110 connect to an inner peripheral surface of the rim 104 may be pulled radially inwards due to material shrinkage of the ribs 110 and the like. As a result, radii R drawn to top lands 114 corresponding to the positions at which the ribs 110 connect to the rim 104 become smaller than radii R drawn to top lands 114 not corresponding to positions at which the ribs 110 connect to the rim 104 (i.e., the gear 100 becomes radially nonuniform), whereby the top land circle becomes distorted.

When a synthetic resin gear having a distorted top land circle is used, angle speed of a member (e.g., another gear or a timing belt) driven by the gear varies despite the angle speed of the gear being constant, which results in uneven rotation of the driven member. Consequently, uneven rotation of the driven member can adversely affect the drive in which the gear is employed.

SUMMARY OF THE INVENTION

In view of the aforementioned facts, it is an object of the present invention to provide a transmission gear in which the radius of an imaginary circle formed by joining top lands of teeth disposed at an outer periphery of a rim of the transmission gear is uniform in a circumferential direction.

In the driving force transmission device of the present invention, since a disc is disposed on one edge of the rim, the position at which radially-inward pull occurs is shifted to one end of the rim, whereby adverse affects on a driven member resulting from sink marks created by the radially-inward pull can be minimized and precision of teeth that contact a driven member can be improved. As a result, uneven rotation and bias of the driven member can be reduced to ensure constant angle speed.

In the present invention, bias of the rim resulting from post-molding deformation (e.g., warping) of the driving force transmission device can be suppressed by disposing the disc on one edge of the rim. Moreover, by disposing the flange at the opposite edge of the rim, rigidity and strength of the driving force transmission device itself is improved.

Because the ribs in the present invention are preferably disposed around the axis of rotation such that an angle of 180° is not present between any two respective ribs, no tensile force is generated between the ribs when post-molding shrinkage occurs. Therefore, radially-inward pull can be reduced in comparison with a case in an angle of 180° is present between ribs disposed on mutually opposite sides of an axis of rotation.

Moreover, in the present invention, by disposing the ribs at positions on the inner peripheral surface of the rim corresponding to the bottom lands between the teeth, local increases in thickness can be prevented to ensure that the top land circle has a uniform radius in the circumferential direction. Accordingly, since there is neither variance in the angle speed nor uneven rotation of a member driven by the device, performance of a drive in which the transmission device of the present invention is employed can be improved.

In the present invention, an annular rib is preferably formed between the axis of rotation and the rim, and separates the ribs into inner and outer ribs. Because the inner ribs connect the axis of rotation and the annular rib and the outer ribs connect the annular rib and the rim, rigidity and strength of the driving force transmission device can be improved. Because the annular rib separates the inner ribs from the outer ribs, the length of each radial rib can be shortened, whereby sink marks in the teeth can be reduced. Further, because the outer ribs are radially offset from the inner ribs, tensile forces between the inner and the outer ribs generated by material shrinkage at the time of molding cancel each other out at the annular rib, thereby reduce sink mark in the tooth crests.

DESCRIPTION OF THE PREFERRED EMBODIMENTS

A driving force transmission device relating to an embodiment of the present invention will be explained.

Figure 1:
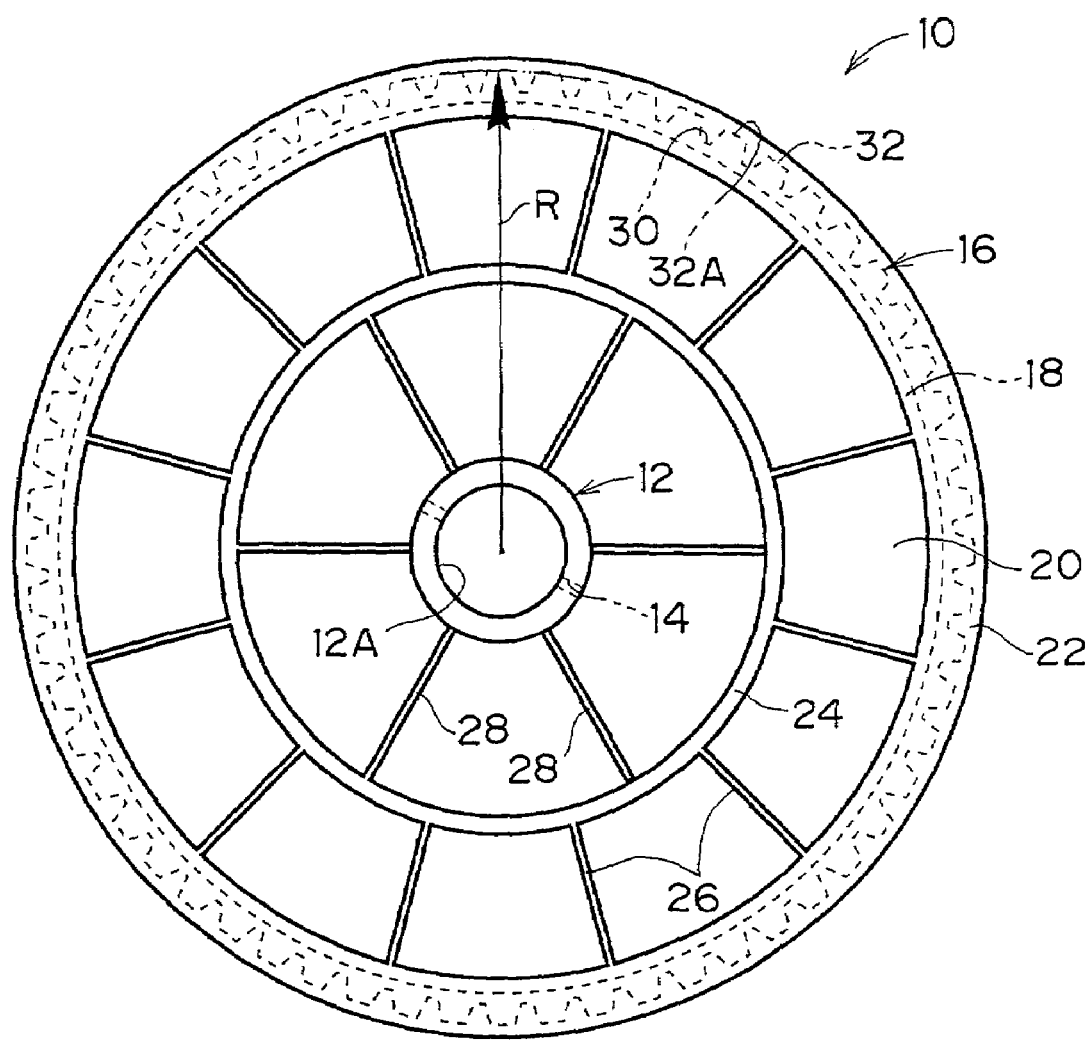
FIG. 1 is a plan view of a driving force transmission device relating to an embodiment of the present invention.
Figure 2:
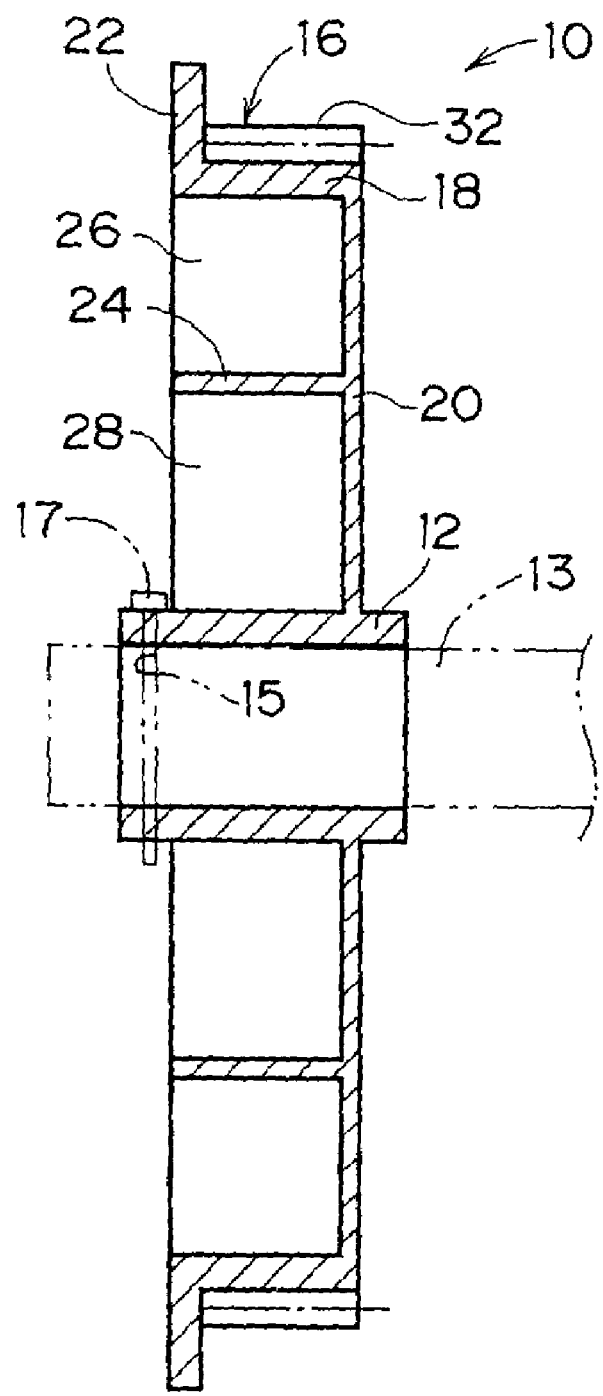
FIG. 2 is a cross-sectional view of the driving force transmission device relating to the embodiment of the present invention.

FIGS. 1 and 2 illustrate a driving force transmission device 10 made of a synthetic resin having excellent sliding performance, such as polyacetal resin (e.g., Duracon™). A cylindrical boss 12 is formed at the center of the device 10. Two locking holes 14 facing each other are formed at an end of the boss 12.

A shaft 13 is inserted into an opening 12A of the boss 12. The shaft 13 includes a through hole 15 whose diameter is substantially as large as the diameter of the locking holes 14 and through which a pin 17 is passed.

After the shaft 13 is inserted into the opening 12, the pin 17 is passes through the locking holes 14 and the through hole 15 to fix the device 10 on the shaft 13 via the boss 12, whereby rotation of the device 10 relative to the shaft 13 is prevented.

A rim 18 is disposed at an outer periphery of the device 10. The rim 18 includes an outer periphery disposed with teeth 16, with bottom lands 30 being formed between respectively adjacent teeth 16 and top lands 32 being formed at faces 32A of the teeth 16. A disc 20 is disposed on one edge of the rim 18 and connects to the boss 12. The disc 20 includes a gate (not shown) through which melted synthetic resin material is injected into a hollow region (i.e., product region) of a mold. The material flows in from the gate and fills up the entire product region through a member corresponding to the disc 20.

Because the disc has conventionally been disposed at a width-direction center of the rim, the width-direction center of the rim may be pulled radially inwards (i.e., towards the boss) due to material shrinkage after molding, to thereby create sink marks. In the present invention, however, since the disc 20 is disposed on one edge of the rim 18, the position at which the radially-inward pull occurs is shifted to one end of the rim 18, whereby adverse affects on a driven member (e.g., another gear or a timing belt) resulting from sinks marks created by the radially-inward pull can be minimized and precision of the teeth 16 that contact the driven member can be improved.

As a result, uneven rotation and bias of the driven member can be reduced to ensure constant angle speed. Moreover, compared with the case in which the disc 20 is disposed at the width-direction center of the rim 18, form and structure of the mold can be simplified, thereby reducing manufacturing costs of the mold.

Because the thickness of the disc 20 in the present embodiment is 60% or less of the thickness of the rim 18, there is substantially no radially-inward pull where the disc 20 and the rim 18 connect with each other.

A flange 22 is disposed on and extends outwardly from the edge of the rim 18 that is opposite to the edge at which the disc 20 is disposed. Accordingly, the device 10 itself is reinforced, and deformation (e.g., warping) of the device 10 occurring after the device 10 has been molded can be suppressed by disposing the disc 20 at one edge of the rim 18, whereby the teeth 16 do not tilt outwardly or inwardly.

An annular rib 24 is formed on the disc 20 concentrically with and between the boss 12 and the rim 18. Ribs 26 and 28 are also radially disposed on the disc 20 in alignment with an axial center of the boss 12, with the ribs 26 being interposed between and connecting the annular rib 24 and the rim 18 and the ribs 28 being interposed between and connecting the boss 12 and the annular rib 24. The ribs 26 and 28 improve rigidity and strength of the device 10.

Moreover, by disposing the annular rib 24, it is possible to separate the ribs 26 from the ribs 28 so that the length of each rib can be shortened, whereby sink marks on the teeth 16 can be reduced.

Figure 3:
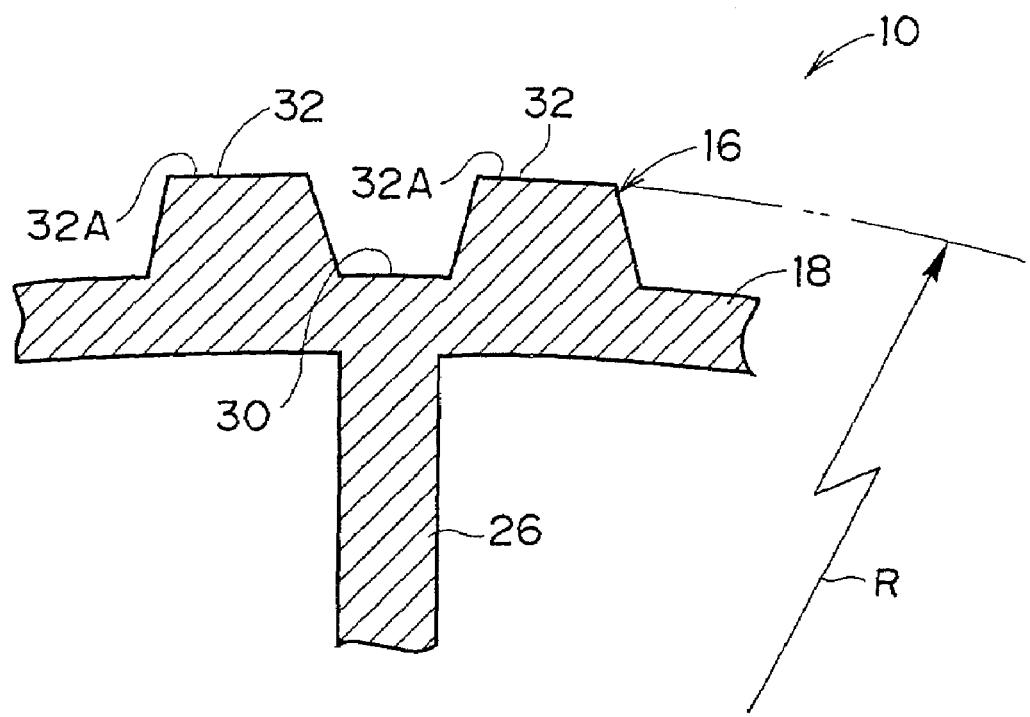
FIG. 3 is an enlarged view illustrating relative positions of teeth and a rib of the driving force transmission device relating to the embodiment of the present invention.

As shown in FIG. 3, the ribs 26 connect to positions on the inner peripheral surface of the rim 18 corresponding to the bottom lands 30 between the teeth 16. Moreover, the top lands 32 are radially thicker than the bottom lands 30. When the ribs are disposed at positions on the inner peripheral surface of the rim 18 corresponding to the top lands 32, the faces 32A of the teeth 16 are radially pulled inwards, whereby a radius R equal to the distance from the axial center of the boss 12 to an imaginary circle formed by joining the top lands 32 (hereinafter, "top land circle") becomes nonuniform.

By disposing the ribs 26 at positions on the inner peripheral surface of the rim 18 corresponding to the bottom lands 30, local increases in the thickness of the device 10 can be prevented to ensure that the top land circle has a uniform radius R in the circumferential direction.

Accordingly, since there is neither variance in the angle speed nor uneven rotation of a member driven by the device 10, performance of a drive in which the device 10 is employed can be improved.

Though the ribs 26 may be arranged equidistantly, with a same predetermined angle being disposed between each pair of respectively adjacent ribs 26, this is not always possible due to the ribs 26 being disposed at positions on the inner peripheral surface of the rim 18 corresponding to the bottom lands 30. In this case, the arrangement of the ribs 26 may also be patterned (e.g., by disposing mutually equal angles between every other pair of respectively adjacent ribs 26).

As shown in FIG. 1, the ribs 28 are radially offset from the ribs 26. Thus, tensile forces between the ribs 28 and the ribs 26 generated by material the shrinkage at the time of molding cancel each other out at the annular rib 24, thereby reducing sink marks in the faces 32A.

The ribs 26 in the present embodiment are thinner than the ribs 28. Since the ribs 28 connect the boss 12 and the annular rib 24, the ribs 28 have no direct influence on the faces 32A. Therefore, thickness can be determined in accordance with required strength of the device 10. In contrast, because the ribs 26 connect the annular rib 24 and the rim 18, the ribs 26 have direct influence on the faces 32A. By forming the ribs 26 thinner than the ribs 28, sink marks in the faces 32A can be substantially prevented.

In the event that the strength of the device 10 itself may be insufficient due to the ribs 26 being thin, the strength of the device 10 can be increased by increasing the number of ribs 26.

Though the present invention has been described by way of the transmission device 10, the present invention is not limited thereto. As long as a driving force is transmitted, the present invention can be applied to any gear or pulley. In the driving force transmission device of the present invention, post-molding deformation (e.g., warping) of the device 10 is suppressed by the disc 20 being disposed on one edge of the rim 18 and the flange 22 being disposed at the opposite edge of the rim 18. Moreover, since the teeth 16 do not tilt inwardly or outwardly, the position of a belt wound around a pulley to which the present invention is applied does not shift during rotation of the pulley. In the case of the pulley, the tooth width of a pulley must be wider than the belt width to prevent friction between the belt and the flange.

Though the device 10 in the present embodiment includes the annular rib 24 on the disc 20, it is unnecessary to form the annular rib 24 if the reference pitch circle of the device 10 is small. In this case, however, an odd number of ribs 38 must be provided to connect a boss 34 and a rim 36, as shown in FIG. 4.

Figure 4:
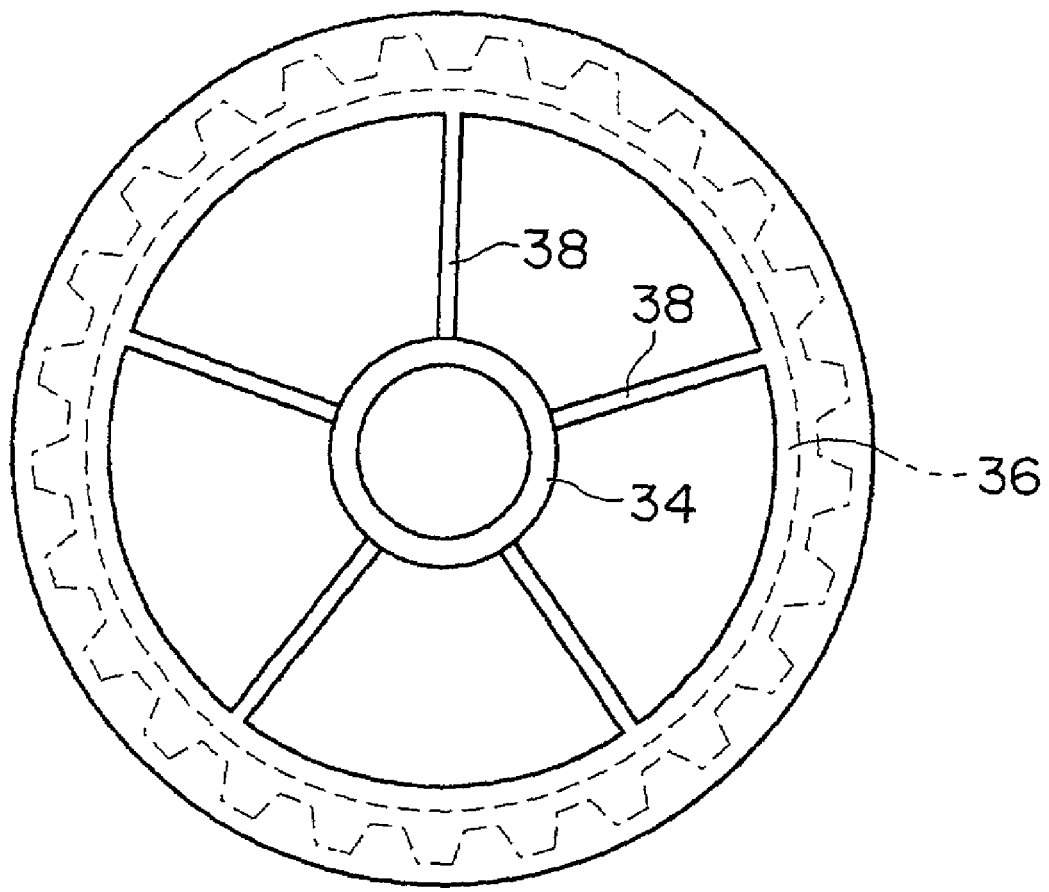
FIG. 4 is a plan view of another driving force transmission device relating to the embodiment of the present invention.
Figure 5:
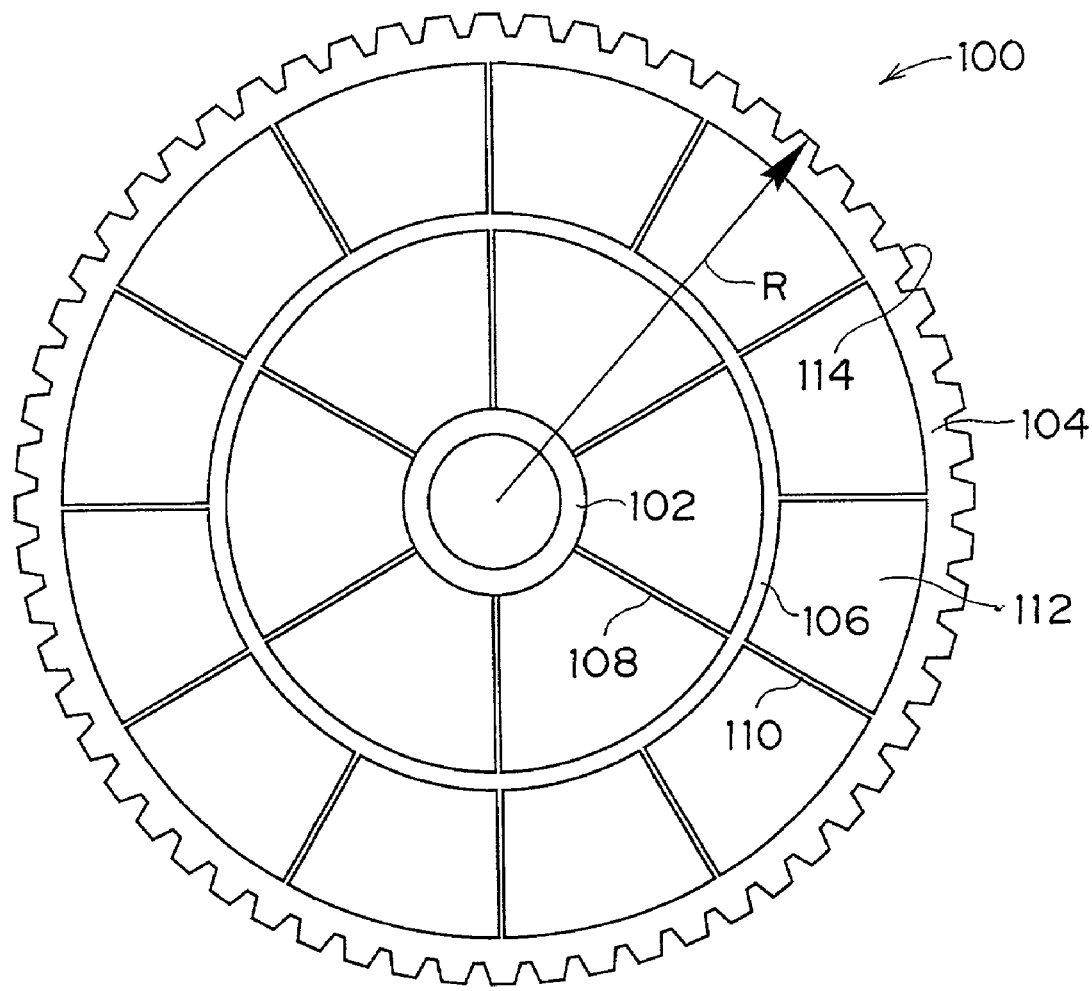
FIG. 5 is a plan view of the conventional driving force transmission device.
Figure 6:
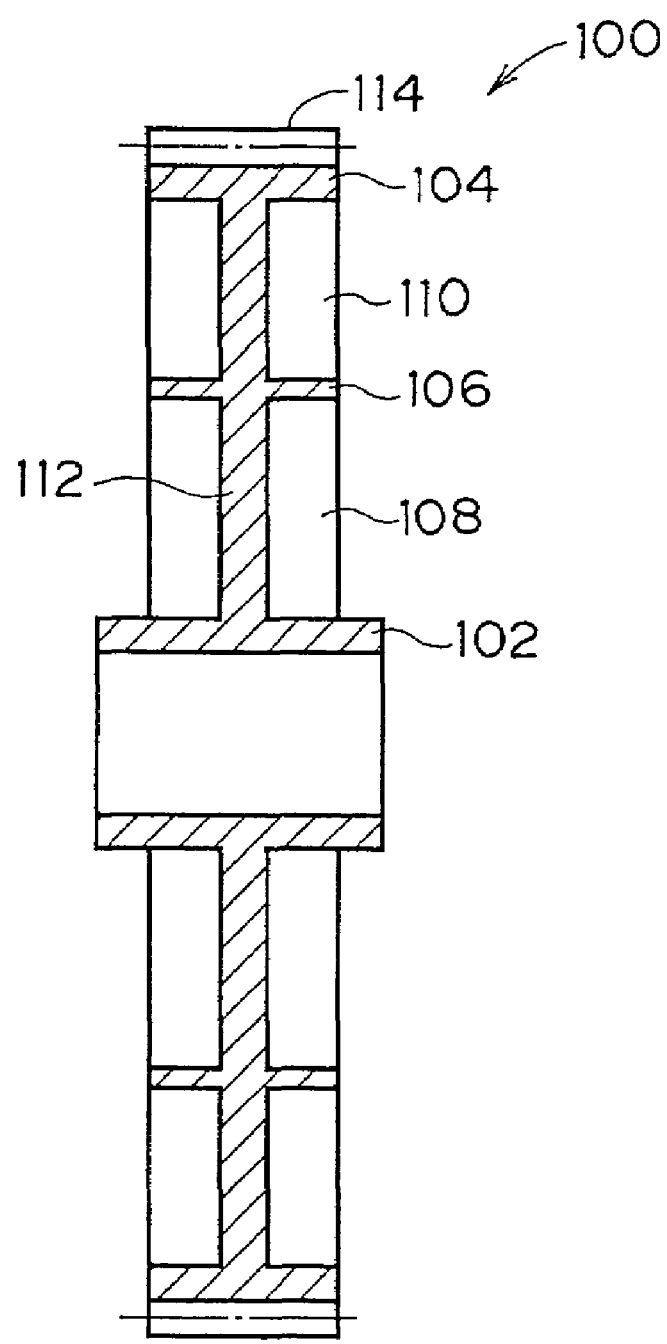
FIG. 6 is a cross-sectional view of a conventional driving force transmission device.

Because the ribs 38 of the gear shown in FIG. 4 are radially disposed around the boss 34 such that each rib 38 has a respectively different alignment (i.e., an angle of 180° is not present between any two respective ribs 38), no tensile force is generated between the ribs 38 when post-molding shrinkage occurs. Therefore, radially-inward pull can be reduced in comparison with a case in an angle of 180° is present between ribs 38 disposed on mutually opposite sides of the boss 34.

In the driving force transmission device of the present invention, since the disc is disposed on one edge of the rim, the position at which radially-inward pull occurs is shifted to one end of the rim, whereby adverse affects on a driven member resulting from sink marks created by the radially-inward pull can be minimized and precision of the teeth that contact the driven member can be improved. As a result, uneven rotation and bias of the driven member can be reduced to ensure constant angle speed.

In the present invention, bias of the rim resulting from post-molding deformation (e.g., warping) of the driving force transmission device can be suppressed by disposing the disc on one edge of the rim. Moreover, by disposing the flange at the opposite edge of the rim, rigidity and strength of the driving force transmission device itself is improved.

Because the ribs in the present invention are preferably radially disposed around the boss such that an angle of 180° is not present between any two respective ribs, no tensile force is generated between the ribs when post-molding shrinkage occurs. Therefore, radially-inward pull can be reduced in comparison with a case in an angle of 180° is present between ribs disposed on mutually opposite sides of an axis of rotation (i.e., a boss).

Moreover, in the present invention, by disposing the ribs at positions on the inner peripheral surface of the rim corresponding to the bottom lands between the teeth, local increases in thickness can be prevented to ensure that the top land circle has a uniform radius in the circumferential direction. Accordingly, since there is neither variance in the angle speed nor uneven rotation of a member driven by the gear, performance of a drive in which the transmission device of the present invention is employed can be improved.

In the present invention, an annular rib is preferably formed between the axis of rotation and the rim, and separates the ribs into inner and outer ribs. Because the inner ribs connect the axis of rotation and the annular rib and the outer ribs connect the annular rib and the rim, rigidity and strength of the driving force transmission device can be improved. Because the annular rib separates the inner ribs from the outer ribs, the length of each radial rib can be shortened, whereby sink marks in the teeth can be reduced. Further, because the outer ribs are radially offset from the inner ribs, tensile forces between the inner and the outer ribs generated by material shrinkage at the time of molding cancel each other out at the annular rib, thereby reduce sink mark in the tooth crests.

What is claimed is:

1. A driving force transmission device made of synthetic resin, comprising:
    an annular rim including an outer periphery disposed with teeth;
    a disc disposed on one edge of the rim;
    an axis of rotation formed in a center of the disc and at an inner side of the rim;
    ribs extending along lines which extend radially from the axis of rotation and said ribs connect to an inner peripheral surface of the rim; and
    a flange which extends outward from an edge of the rim that is opposite to the edge at which the disc is provided.

2. The driving force transmission device of claim 1, wherein the number of the ribs disposed is equal to an odd number.

3. A gear made of synthetic resin, comprising:
    an annular rim including an outer periphery disposed with teeth;
    a disc disposed on one edge of the rim;
    an axis of rotation formed in a center of the disc and at an inner side of the rim;
    ribs extending along lines which extend radially from the axis of rotation and said ribs connect to an inner peripheral surface of the rim; and
    a flange which extends outward from an edge of the rim that is opposite to the edge at which the disc is provided.

4. The gear of claim 3, wherein the ribs connect to positions on the inner peripheral surface of the rim corresponding to bottom lands between the teeth.

5. The gear of claim 4, wherein an annular rib is formed on the disc between the axis of rotation and the rim, with the annular rib separating the ribs into inner and outer ribs, the inner ribs extending from the axis of rotation to the annular rib and the outer ribs extending from the annular rib to the rim, and the outer ribs being radially offset from the inner ribs.

6. The gear of claim 5, wherein the outer ribs are thinner than the inner ribs.

7. A pulley made of synthetic resin, comprising:
    an annular rim including an outer periphery disposed with teeth;
    a disc disposed on one of edges of the rim;
    an axis of rotation formed in a center of the disc and at an inner side of the rim;
    ribs extending along lines which extend radially from the axis of rotation and said ribs connect to an inner peripheral surface of the rim; and
    a flange which extends outward from an edge of the rim that is opposite to the edge at which the disc is provided.

8. The pulley of claim 7, wherein the number of the ribs disposed is equal to an odd number.

9. The pulley of claim 7, wherein the ribs connect to positions on the inner peripheral surface of the rim corresponding to bottom lands between the teeth.

10. The pulley of claim 9, wherein an annular rib is formed on the disc between the axis of rotation and the rim, with the annular rib separating the ribs into inner and outer ribs, the inner ribs extending from the axis of rotation to the annular rib and the outer ribs extending from the annular rib to the rim, and the outer ribs being radially offset from the inner ribs.

* * * * *